United States Patent
Hansen et al.

(10) Patent No.: US 12,539,682 B2
(45) Date of Patent: Feb. 3, 2026

(54) MOULDING SYSTEM FOR DIRECT INJECTION MANUFACTURING OF FOOTWEAR

(71) Applicant: ECCO Sko A/S, Bredebro (DK)

(72) Inventors: Jakob Moller Hansen, Bredebro (DK); Jens Sonne Mortensen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 289 days.

(21) Appl. No.: 17/438,778

(22) PCT Filed: Mar. 12, 2020

(86) PCT No.: PCT/DK2020/050064
§ 371 (c)(1),
(2) Date: Sep. 13, 2021

(87) PCT Pub. No.: WO2020/182261
PCT Pub. Date: Sep. 17, 2020

(65) Prior Publication Data
US 2022/0152963 A1 May 19, 2022

(30) Foreign Application Priority Data

Mar. 13, 2019 (EP) .................................... 19162519
May 21, 2019 (EP) .................................... 19175667
(Continued)

(51) Int. Cl.
*B29D 35/00* (2010.01)
*B29D 35/12* (2010.01)
(Continued)

(52) U.S. Cl.
CPC ....... *B29D 35/0036* (2013.01); *B29D 35/122* (2013.01); *B33Y 80/00* (2014.12);
(Continued)

(58) Field of Classification Search
CPC .............. B29D 35/0036; B29D 35/122; B29D 35/0045; B29D 35/06; B29D 35/061;
(Continued)

(56) References Cited

U.S. PATENT DOCUMENTS

| 696,246 A | 3/1902 | Kosters |
| 1,163,630 A | 12/1915 | Anderson |

(Continued)

FOREIGN PATENT DOCUMENTS

| AU | 419135 B2 | 11/1971 |
| AU | 2016204359 | 1/2018 |

(Continued)

OTHER PUBLICATIONS

Chunlei, Chai "Business Innovation Design", Huazhong University of Science and Technology Press, Jun. 30, 2014, 4 pages.

(Continued)

*Primary Examiner* — Thu Khanh T. Nguyen
(74) *Attorney, Agent, or Firm* — Lee & Hayes, P.C.

(57) ABSTRACT

A molding system for direct injection manufacturing of footwear. The molding system includes a mold cavity for receiving injection material for molding a sole part of the footwear. The system further includes a plurality of basic direct injection molds, each of which is attachable to injection molding equipment, and a plurality of sets of direct injection mold inserts, each set of direct injection mold inserts being configured to define at least part of an inner surface of the mold cavity when inserted in one of the plurality of basic direct injection molds. At least two of the plurality of basic direct injection molds differ from each other in size, corresponding to different ranges of sole part sizes.

17 Claims, 10 Drawing Sheets

(30) Foreign Application Priority Data

Figure 1:
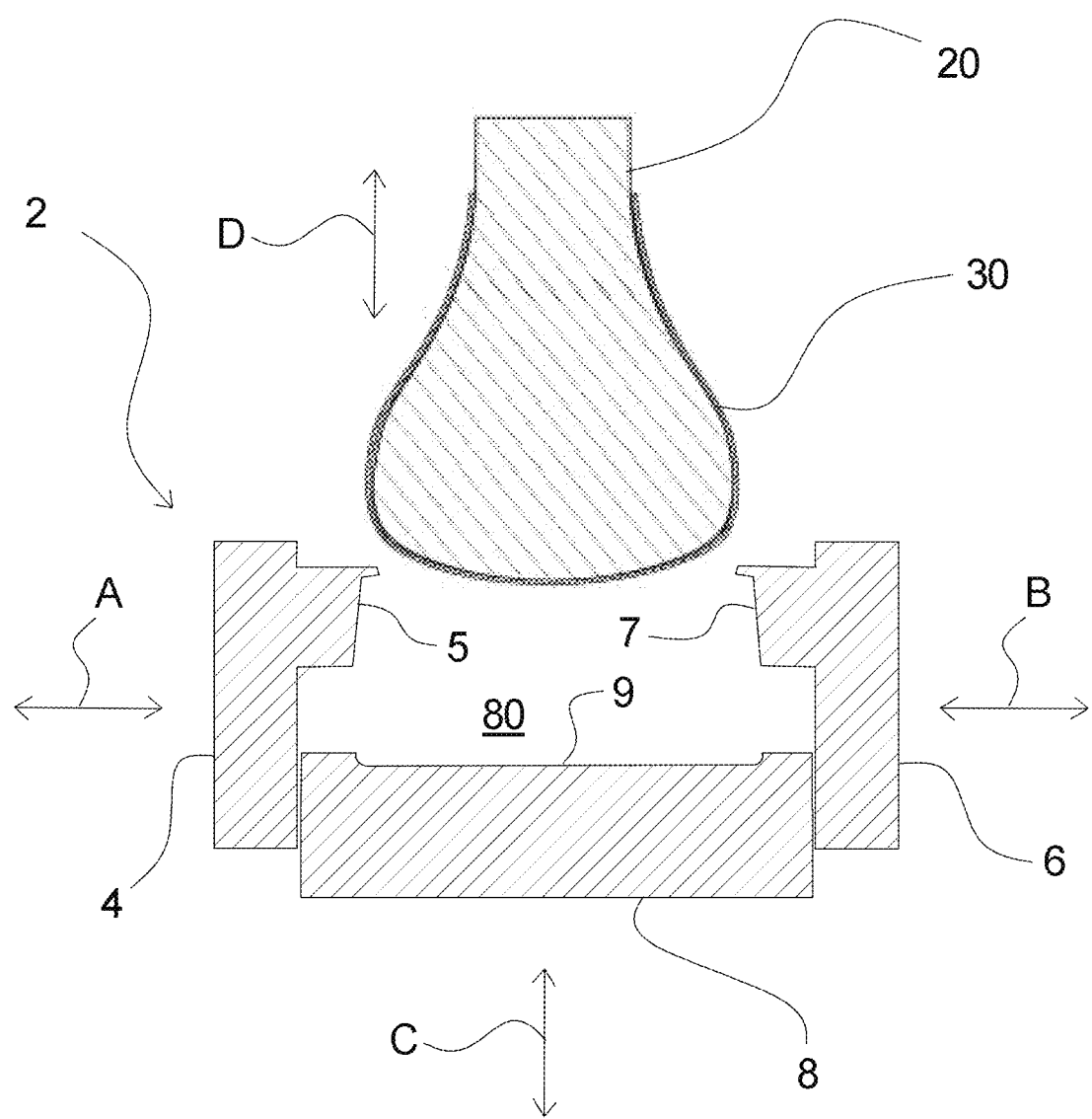

| | | |
|---|---|---|
| Jul. 18, 2019 | (DK) | PA201970470 |
| Jul. 18, 2019 | (DK) | PA201970471 |
| Aug. 19, 2019 | (EP) | 19192265 |
| Dec. 20, 2019 | (DK) | PA201970821 |

(51) Int. Cl.
*B33Y 80/00* (2015.01)
*B29C 45/14* (2006.01)
*B29C 45/17* (2006.01)
*B29D 35/08* (2010.01)

(52) U.S. Cl.
CPC .............. *B29C 45/14* (2013.01); *B29C 45/17* (2013.01); *B29D 35/0045* (2013.01); *B29D 35/081* (2013.01); *B29K 2905/02* (2013.01)

(58) Field of Classification Search
CPC .............. B29D 35/0009; B29D 35/081; B29D 35/082; B33Y 80/00; B29K 2905/02; B29C 45/1418; B29C 45/14196; B29C 45/17; B29C 45/2673; B29C 45/2675
USPC ........................................................ 425/542
See application file for complete search history.

(56) References Cited

U.S. PATENT DOCUMENTS

| | | | |
|---|---|---|---|
| 1,460,358 | A | 6/1923 | Krentler |
| 3,314,173 | A | 4/1967 | Szerenyl |
| 3,317,940 | A | 5/1967 | Herbert |
| 3,501,793 | A | 3/1970 | Jonas |
| 3,601,831 | A | 8/1971 | Daum |
| 3,677,679 | A | 7/1972 | Christie et al. |
| 5,871,683 | A | 2/1999 | Schaper et al. |
| 5,881,413 | A | 3/1999 | Throneburg et al. |
| 6,132,663 | A | 10/2000 | Johnson |
| 10,293,565 | B1 | 5/2019 | Tran |
| 2001/0020222 | A1 | 9/2001 | Lee et al. |
| 2005/0071935 | A1 | 4/2005 | Shah et al. |
| 2005/0144034 | A1 | 6/2005 | Hunter |
| 2007/0193068 | A1 | 8/2007 | Calvano et al. |
| 2007/0240338 | A1 | 10/2007 | Din Mahamed |
| 2009/0072436 | A1 | 3/2009 | Dean |
| 2014/0277658 | A1 | 9/2014 | Hanft |
| 2015/0298413 | A1* | 10/2015 | Yang ............... B29C 45/2673 425/183 |
| 2016/0107354 | A1* | 4/2016 | Holderman ......... B29C 45/2675 425/195 |
| 2016/0107391 | A1 | 4/2016 | Parish et al. |
| 2016/0166010 | A1 | 6/2016 | Bruce et al. |
| 2016/0360823 | A1 | 12/2016 | Garbujo et al. |
| 2017/0095036 | A1 | 4/2017 | Chen |
| 2017/0197345 | A1 | 7/2017 | Okamoto |
| 2017/0202309 | A1 | 7/2017 | Sterman et al. |
| 2017/0238659 | A1 | 8/2017 | Bohnsack et al. |
| 2017/0239903 | A1 | 8/2017 | Kilgore |
| 2017/0239909 | A1 | 8/2017 | Janney et al. |
| 2017/0306539 | A1 | 10/2017 | Gladish |
| 2018/0317606 | A1* | 11/2018 | Schneider ............. A43B 13/226 |
| 2019/0073709 | A1* | 3/2019 | Hayes ................ B22F 10/20 |
| 2019/0152149 | A1 | 5/2019 | Arayama |
| 2019/0153149 | A1 | 5/2019 | Toba |
| 2019/0344519 | A1* | 11/2019 | Lin ................. B29C 44/3415 |
| 2022/0152962 | A1 | 5/2022 | Hansen et al. |
| 2023/0189938 | A1 | 6/2023 | Hansen |

FOREIGN PATENT DOCUMENTS

| | | |
|---|---|---|
| CN | 1475340 A | 2/2004 |
| CN | 101557925 A | 10/2009 |
| CN | 102414013 A | 4/2012 |
| CN | 102596551 A | 7/2012 |
| CN | 202592652 U | 12/2012 |
| CN | 203665868 U | 6/2014 |
| CN | 203697349 U | 7/2014 |
| CN | 105495863 A | 4/2016 |
| CN | 106103035 A | 11/2016 |
| CN | 205869403 | 1/2017 |
| CN | 206170682 | 5/2017 |
| CN | 206568446 U | 10/2017 |
| CN | 207011808 U | 2/2018 |
| CN | 108158134 A | 6/2018 |
| CN | 108673919 A | 10/2018 |
| CN | 213618060 U | 7/2021 |
| DE | 2721443 A1 | 11/1978 |
| DE | 10319593 | 11/2003 |
| DK | 202070841 | 8/2022 |
| EP | 0313312 A2 | 4/1989 |
| EP | 2110037 | 10/2009 |
| ES | 2653974 B2 | 10/2018 |
| FR | 1414588 A | 10/1965 |
| FR | 2572324 B4 | 12/1986 |
| GB | 1075256 A | 7/1967 |
| GB | 1083199 | 9/1967 |
| GB | 1197727 A | 7/1970 |
| GB | 1504232 | 3/1978 |
| GB | 2105252 | 3/1983 |
| JP | 2004090998 | 5/2004 |
| JP | 2016097116 A | 5/2016 |
| JP | 2016198496 A | 12/2016 |
| JP | 2018194945 | 12/2018 |
| KR | 20020096188 | 12/2002 |
| KR | 100737426 | 7/2007 |
| KR | 20170089514 | 8/2017 |
| TW | 587014 B | 5/2004 |
| WO | 02070239 W | 9/2002 |
| WO | WO2007126184 | 11/2007 |
| WO | WO2008049430 | 5/2008 |
| WO | WO2010136855 | 12/2010 |
| WO | WO2011049306 | 4/2011 |
| WO | WO2013143541 | 10/2013 |
| WO | 2015033272 A1 | 3/2015 |
| WO | WO2016196995 | 12/2016 |
| WO | 2019219532 A1 | 11/2019 |
| WO | 2020011514 A1 | 1/2020 |
| WO | 2020182260 A1 | 9/2020 |
| WO | WO2020182259 | 9/2020 |
| WO | WO2020182261 | 9/2020 |

OTHER PUBLICATIONS

PCT Search Report for corresponding PCT Application No. PCT/DK2020/050064 dated May 25, 2020, 3 pages.
Office Action for U.S. Appl. No. 17/438,717, mailed on Apr. 17, 2024, Hansen, "A System for Manufacturing Last-Based Equipment for Direct Injection Production of Footwear and a Method for Manufacturing Footwear", 9 pages.
Machine translation of Alese et al (JP 2016198496A) dated Dec. 2016. (Year: 2016).
Machine translation of Cai (CN 202592652 U) dated Dec. 2012. (Year: 2012).
Machine translation of FR 2572324 A dated May 1986. (Year: 1986).
Office Action for U.S. Appl. No. 17/438,666, mailed on Nov. 30, 2023, Hansen, "A System for Manufacturing Mould-Based Equipment for Direct Injection Production of Footwear and a Method for Manufacturing Footwear", 9 pages.
Office Action for U.S. Appl. No. 17/438,854, mailed on Oct. 20, 2023, Mortensen, "Footwear Injection Mould", 8 Pages.
Office Action for U.S. Appl. No. 17/612,693, mailed on Nov. 7, 2023, Jakob Moller Hansen, "Footwear Last", 13 pages.
Office Action for U.S. Appl. No. 17/438,717, mailed on Oct. 7, 2024, Hansen, "A System for Manufacturing Last-Based Equipment for Direct Injection Production of Footwear and a Method for Manufacturing Footwear", 7 Pages.
Office Action for U.S. Appl. No. 17/636,334, Dated Aug. 1, 2024.

* cited by examiner

MOULDING SYSTEM FOR DIRECT INJECTION MANUFACTURING OF FOOTWEAR

This Application claims priority to PCT Application No. PCT/DK2020/050064, filed Mar. 12, 2020, which claims priority to EP Patent Application No. 19162519.3, filed Mar. 13, 2019; to EP Patent Application No. 19175667.5, filed on May 21, 2019; to EP Patent Application No. 19192265.7, filed on Aug. 19, 2019; to DK Patent Application No. PA 2019 70470, filed Jul. 18, 2019; to DK Patent Application No. PA 2019 70471, filed Jul. 18, 2019; and to DK Patent Application No. PA 2019 70821, filed Dec. 20, 2019, the contents of each of which is incorporated herein by reference.

FIELD OF THE INVENTION

The invention relates to a moulding system and a direct injection production method.

BACKGROUND OF THE INVENTION

It is well-known to manufacture footwear by means of direct injection moulding of the sole to the upper.

The direct injection process (DIP) is advantageous in many ways as the manufactured footwear may be produced to possess both flexibility and strength at the same time.

A challenge in relation to such a direct injection process is that the method of manufacture is relatively expensive and not applicable for small-number production series.

SUMMARY OF THE INVENTION

The invention relates to a moulding system for direct injection production of footwear, said moulding system comprising a mould cavity for receiving injection material for moulding a sole part of said footwear, said moulding system comprising
   a plurality of basic direct injection moulds, each of which is attachable to injection moulding equipment, and
   a plurality of sets of direct injection mould insert(s), each set of direct injection mould insert(s) being configured to define at least part of an inner surface of said mould cavity when inserted in one of said plurality of basic direct injection moulds, wherein at least two of said plurality of basic direct injection moulds differ from each other in size, corresponding to different ranges of sole part sizes.

Hereby, production of a range of footwear, e.g. different sizes, different types, e.g. male/female, left/right, etc., where the soles of the footwear are produced by a direct injection production (DIP) process, may be performed with an improved, consistent quality and whereby the production may be performed in a cost-efficient manner. In connection with direct injection production, where the sole of a footwear is moulded directly on the footwear, a mould made from e.g. a block of aluminium may be used and where the mould is made with a mould cavity that corresponds to the specific size footwear in question. This, however, requires a relatively high number of separate moulds to be present and will thus be encumbered with relatively high costs related to the production equipment. Therefore, it has been devised that a basic direct injection mould may be utilized, wherein direct injection mould insert(s) are mounted in order to define the required shape and size of the mould cavity. To cover a range of e.g. shoe sizes, etc., the direct injection mould insert(s) are made in different sizes, e.g. in sets. According to the invention, a plurality of basic direct injection moulds is comprised in the moulding system and wherein at least two of these differ from each other in size, e.g. the size of an inner cavity, wherein a set of direct injection mould insert(s) can be mounted. Thus, one of the basic direct injection moulds may be used when for example soles for footwear in US sizes 6 to 7.5 are to be produced and where a specific set of direct injection mould insert(s) can be mounted, e.g. in order to produce a US size 7. When for example soles for footwear in US sizes 8 to 10 are to be produced, another one of the at least two different basic direct injection moulds may be used, where another specific set of direct injection mould insert(s) can be mounted, e.g. in order to produce a US size 9.5 sole.

By the invention it is achieved that a wide range of sole sizes may be produced by the moulding system and whereby disadvantages stemming from use of mould insert(s) that are relatively slim or mould insert(s) that are relatively thick may be avoided. In case it would be attempted using a single basic direct injection mould for a relatively wide range of sole sizes, this would require that at one end of the range the mould insert(s) would be relatively voluminous, e.g. thick, and at the other end of the range the mould insert(s) would be relatively small, e.g. thin and possibly flimsy, fragile, etc. Both of these instances might cause problems when performing the injection moulding as regards the temperature and/or temperature control, since the injection moulding equipment heats up the mould to have a predetermined temperature, where the temperature affects the curing of the injected material that forms the sole. Too low a temperature may lead to flaws in the sole and too high a temperature may enhance the production time, e.g. due to possible extended curing times, and may lead to other problems as well. Depending on the material of the mould insert(s), the variation in e.g. thickness of these insert(s) may give rise to problems when trying to achieve a desired mould temperature and temperature profile, e.g. the temperature of the inner surface of the mould cavity. For example, thick insert(s) (with e.g. a lower heat conductivity than the basic direct injection mould material) may result in a reduced heat transfer and thus a slower production rate, e.g. in connection with start-up using a new ("cold") set of insert(s), extended curing periods, flaws in the soles, etc. To this should be kept in mind that a shift between such thin and thick insert(s), when changing production from one size footwear to another would require adjustments in the production equipment to counteract the change in heat transfer and heat capacity characteristics. Further, thin insert(s) may be more difficult to mount within the mould cavity in a satisfactory manner, since e.g. they may flex and may slip out of e.g. grip with the coupling means, etc. These and other problems and disadvantages may be avoided when using a moulding system according to the invention.

The term "sets of direct injection mould insert(s)"-includes down to one insert. The different embodiments of the invention are mainly shown in this application with three mould insert, which is preferred. But it is also clear that other numbers, down to one, may be applied within the scope of the invention.

In an embodiment of the invention said plurality of basic direct injection moulds is within an interval of 2-40 such as 2-30 or such as 2-20.

The number of basic injection moulds for a given footwear should match the desired sizes and, in some embodiments, ensure that the insert(s) are small enough in size/volume to make the moulding system work properly with a direct injection process equipment. A feasible approach may be to determine the number of sizes of the design and then use the same number of base moulds, of course multiplied with two to obtain both a left and a right footwear item. For a shoe series of e.g. 3 to 16 (Mens US Size), that would be 2*14=28 different base moulds and then 3D-print respective mould insert(s) to each applied base mould, or base mould set.

An alternative would be to use the same base mould for two different sizes, e.g. size 11 and 12 and then print corresponding different insert(s), fitting in the same base mould, but in the inner cavity defining a sole in sizes 11 and 12, respectively.

It is thus possible to reduce the number of base moulds if so desired. It should nevertheless be noted that base mould may be reused between different shoe series just with other insert(s), so in many applications, it would make perfect sense simply to decide on an optimal shape for each desired size, e.g. different shape of right and left footwear item in the same size, and then just reuse these when producing new design, just with modified insert(s).

In alternative setups, a series would comprise 18 or 24 basic mould sets, one for left and one for right in each set.

In yet alternative setups, a series would comprise 9 or 12 basic mould sets, one for left and one for right in each set and then the complete manufacturing series is obtained by providing two different insert for each mould—thereby reducing the overall number of necessary basic mould by 50%. Other series and strategies may be applied within the scope of the invention.

In an embodiment of the invention the number of said plurality of sets of direct injection mould insert(s) is within an interval of 2-40, such as 2-30 or such as 2-20.

In an embodiment of the invention a set of said plurality of sets of direct injection mould insert(s) comprises a plurality of mould insert parts such as 2, 3, 4, 5 or more. In an embodiment of the invention said plurality of sets (50) of direct injection mould insert(s) is provided together with said plurality of basic direct injection moulds (40).

Hereby, the sets of direct injection mould insert(s) may be provided in an assembly together with the respective basic direct injection moulds, whereby the moulding system may be set up in a relatively uncomplicated manner, e.g. when making soles for footwear in US size 11.5, where the thus marked set of direct injection mould insert(s) may be picked and mounted in the specific basic direct injection mould, e.g. the basic direct injection mould which is designated for use in connection with production of soles within the range of e.g. US size 10.5 to 12. The mould insert(s) may thus be configured as regards e.g. material, heat transfer characteristics, heat capacity characteristics, etc. to be optimal in connection with the specific basic direct injection mould.

In an embodiment of the invention said plurality of sets of direct injection mould insert(s) are manufactured by an additive manufacturing process, e.g. by 3D printing.

Hereby, the sets of direct injection mould insert(s) may be provided, e.g. manufactured locally, at or near the production site and/or when a particular set of mould insert(s) or an exchange of mould insert(s) is required. Thus, the moulding system may not even be delivered to the production site with actual, physical sets of direct injection mould insert(s), but may be provided with the necessary means to manufacture the mould insert(s), e.g. material data, input data etc. for a 3D printing apparatus or the like in order to manufacture the mould insert(s) to the required specifications in accordance with the particular embodiment of the invention.

Hereby, advantages may be achieved since actual storage of a plurality of sets of direct injection mould insert(s) may be minimized and since production equipment costs may be reduced since only the sets of direct injection mould insert(s) that actually will be used, need to be provided.

It is noted in this connection that when using the term that a plurality of sets of direct injection mould insert(s) is comprised in the system, it will be understood that this may not necessarily require a physical existence of mould insert(s), but that means, e.g. material data, specifications, input data etc. for a 3D printing apparatus or the like may serve the same purpose.

In an embodiment of the invention said plurality of sets of direct injection mould insert(s) are manufactured as required, e.g. locally and/or on demand.

Hereby, a local manufacture, e.g. at or near the production site and/or when a particular set of mould insert(s) or an exchange of mould insert(s) is required, may be an advantageous possibility. Thus, storing of a relatively large number of actual, physical sets of direct injection mould insert(s) may be avoided. Instead, the system may be provided with the necessary means to manufacture the mould insert(s) on demand and as required, e.g. with material data, input data etc. for a 3D printing apparatus or the like in order to manufacture the mould insert(s) to the required specifications in accordance with the particular embodiment of the invention. Furthermore, production equipment costs may be reduced since only the sets of direct injection mould insert(s) that actually will be used, need to be provided.

In an embodiment of the invention said plurality of sets (50) of direct injection mould insert(s) comprises one or more sets to be used in connection with each of the plurality of basic direct injection moulds and wherein two or more sets of direct injection mould insert(s) that are useable in connection with one and the same basic direct injection mould differ from each other at least as regards the sole part size defined by said at least part of an inner surface of said mould cavity.

Hereby, the production system may be optimized in that a suitable number of basic direct injection moulds may be configured, which basic direct injection moulds each may be paired with correspondingly configured direct injection mould insert(s) such that these parts together form direct injection moulds that fulfil the purpose of providing the required characteristics as concerns e.g. suitable heat transfer e.g. from the injection moulding equipment to the inner surface of the mounted direct injection mould insert(s), e.g. the mould cavity and the actual injection material that is used to form the sole. In this connection it is noted that in accordance with this embodiment the individual mould insert(s) may be designed with suitable dimensions, e.g. thickness, that ensures on one hand that the heat transfer will not be too small and on the other hand that the actual insert will not be too slim at one or more positions and thus not have inferior strength.

For example, a moulding system may comprise a basic direct injection mould for soles for footwear in US sizes 6 to 7.5, a basic direct injection mould for soles for footwear in US sizes 8 to 10, a basic direct injection mould for soles for footwear in US sizes 10.5 to 12 and a basic direct injection mould for soles for footwear in US sizes 13 to 15.

In connection with these, the respective sets of direct injection mould insert(s) may comprise

- 4 sets for soles for footwear in US sizes 6, 6.5, 7 and 7.5,
- 5 sets for soles for footwear in US sizes 8, 8.5, 9, 9.5 and 10
- 4 sets for soles for footwear in US sizes 10.5, 11, 11.5 and 12 and
- 3 sets for soles for footwear in US sizes 13, 14 and 15.

It is noted that it is a possibility that the ranges may be overlapping, e.g. the first of the above range of direct injection mould insert(s) may comprise US size 8 as well.

This may increase flexibility since e.g. it will not be necessary to change from one basic direct injection mould to the next when for example a production of US size 7.5 shoes have been ongoing and a small production of US size 8 shoes is requested, whereafter the US size 7.5 production will be continued. In such a case, it will only be necessary to switch the direct injection mould insert.

In an embodiment of the invention said plurality of basic direct injection moulds is configured for at least partly channelling injection material to said mould cavity (80).

In an embodiment of the invention said basic direct injection moulds are at least partly manufactured from metal, e.g. aluminium.

In an embodiment of the invention said sets of direct injection mould insert(s) are at least partly manufactured from metal, e.g. aluminium.

In an embodiment of the invention said sets of direct injection mould insert(s) are at least partly manufactured using an additive manufacturing material comprising one or more polymers, comprising one or more photopolymers and/or comprising at least one selected from the list of polymers, resin photopolymers, ABS, PLA, ASA, nylon/nylon powder, PETG, metal/metal powder, plaster powder, HIPS, PET, PEEK, PVA, ULTEM, polyjet resin and/or ceramics and any combination thereof.

In an embodiment of the invention the basic direction mould comprises a mould set of a first basic side mould, a second basic side mould and a basic bottom mould.

In an embodiment of the invention heat conductivity of the basic direct injection moulds at room temperature is above 50 W/(m*K), preferably above 100 W/(m*K), most preferably above 150 W/(m*K).

In an embodiment of the invention heat conductivity of the direct injection mould insert(s) at room temperature is below 5 W/(m*K), such as below 2 W/(m*K), such as below 1 W/(m*K), such as below 0.5 W/(m*K).

In an embodiment of the invention the mould cavity of the plurality of basic direct injection moulds when attached to the injection moulding equipment differs in length (MCL).

In an embodiment of the invention the mould cavity of the plurality of basic direct injection moulds when attached to the injection moulding equipment differs in width (MCW).

In an embodiment of the invention the mould cavity of the plurality of basic direct injection moulds when attached to the injection moulding equipment differs in length (MCL) and width (MCW).

In an embodiment of the invention the direct injection mould insert(s) may comprise side insert(s) having an insert lip, wherein the insert lip comprises an upper contacting surface for contacting the outer surface of a footwear upper and a connecting end connected to the respective side insert.

The insert lip may be integral with the respective side insert.

The lip may have a height h2 at the connecting end of the lip that is larger than the height h1 at the upper contacting surface of the lip, relative to a normal A of the upper contacting surface. The normal A of the upper contacting surface is configured to intersect a centre point of the upper contacting surface seen in the height direction.

The lip may have a length l1 defined by the distance from the upper contacting surface to the connecting end along the normal A of the upper contacting surface.

In one exemplary embodiment the length of the lip l1 may have size that is at least larger than the height h2, i.e. that the length ratio between the length of the lip vs. the height h2 is at least 1:1. In another embodiment the length of the lip may have a size that is smaller than the height h2, i.e. l1<h2. Thus, the height h2 provides support for the length of the lip, where the height h2 of the lip may have to be increased when the length l1 is increased.

In an embodiment of the invention the upper contacting surface may have a height h1 in the range of 2-6 mm and/or wherein the connecting end may have a height h2 in the range of 6-15 mm.

More specifically, the height h1 may be between 3 and 5 mm, or even more specifically around 4 mm. Preferably, the height h1 may be above 2 mm, as a lower thickness may cause the material to bend, deform or warp during injection. This may especially be in a situation where the mould insert is 3D printed from e.g. a polymeric material.

More specifically, the height h2 may be between 7 and 12 mm, where the height may more specifically be between 5-8 and 10 mm. The increased height h2 provides support to the lip especially when the material is 3D printed from e.g. a polymeric material.

In one embodiment the size ratio between the height h1 and h2 may be around 1:2, where h2 may be twice the height of h1. In one embodiment the size ratio may be around 1:1.5, where the height h2 is 50% larger than h1.

The invention moreover relates to a direct injection production method of footwear, said method comprising the steps

- for a specified footwear design,
- defining at least two different pre-defined footwear sizes (FS) to be produced,
- providing at least two basic direct injection moulds each of which is attachable to and operable with injection moulding equipment,
- for each of the plurality of basic direct injection moulds providing at least one set of corresponding direct injection mould insert(s),
- wherein the at least one set of corresponding direct injection mould insert(s) for each of the at least two basic direct injection moulds are defining the at least two different pre-defined footwear sizes.

By providing two different injection moulds defining different inner volume, it is possible to select an injection mould having an inner volume which is relatively small/as small as possible, thereby making it possible to keep the volume and size of the basic injection moulds as low as possible. This is important as the method may become very difficult to implement in a feasible manufacturing environment if the volume and/size of the insert(s) become too big. This may happen because the injected sole material is difficult to keep at a desired temperature by cooling/heating or even passively due to the fact the insert moulds, if applying e.g. insert(s) in typical 3D printing material, will typically possess a very low heat conductivity, and effective serve as an insulator between the injected material and the surrounding basic mould. If this happens, it becomes difficult to control the temperature by the heating/cooling arrangements of the direct injection production equipment, to which the basic mould is operatively attached.

This may lead to soles having cavities or even to complete malfunctioning of the system as the injected material at some instances may harden before being evenly distributed into the mould.

In an embodiment of the invention heat conductivity of the basic direct injection moulds at room temperature is above 50 W/(m*K), preferably above 100 W/(m*K), most preferably above 150 W/(m*K).

In an embodiment of the invention heat conductivity of the direct injection mould insert(s) at room temperature is below 5 W/(m*K), such as below 2 W/(m*K), such as below 1 W/(m*K), such as below 0.5 W/(m*K).

In an embodiment of the invention the mould cavity of the plurality of basic direct injection moulds when attached to the injection moulding equipment differs in length (MCL).

In an embodiment of the invention the mould cavity of the plurality of basic direct injection moulds when attached to the injection moulding equipment differs in width (MCW).

In an embodiment of the invention the mould cavity of the plurality of basic direct injection moulds when attached to the injection moulding equipment differs in length (MCL) and width (MCW).

In an embodiment of the invention the direct injection mould insert(s) are adapted to fit the respective basic injection moulds having different base mould cavity width (MCW).

In an embodiment of the invention the direct injection mould insert(s) are adapted to fit the respective basic injection moulds having different base mould cavity length (MCL).

In an embodiment of the invention, for a predefined footwear size, the basic injection mould and the set of corresponding direct injection mould insert(s) are provided so as to keep the volume or size of the direct injection mould insert(s) as low as possible.

In an embodiment of the invention the thermal conductivity of the at least two basic direct injection moulds and the corresponding direct injection mold inserts are different.

In an embodiment of the invention the at least two basic direct injection moulds are each attachable to injection moulding equipment by means of a releasable fixing arrangement.

In an embodiment of the invention the at least one set of direct injection mould insert(s) for each of the plurality of basic direct injection moulds are defining different respective sizes of the pre-defined footwear sizes.

In an embodiment of the invention basic direct injection moulds may be used in relation to manufacture of one footwear design and re-used in relation to manufacture of another footwear design.

In an embodiment of the invention the basic injection moulds are selected from a plurality of available basics moulds.

In an embodiment of the invention, a footwear is manufactured according to the direct injection production method disclosed herein, and the method is performed in a mould system as disclosed herein.

In an embodiment of the invention mould insert material has a conductivity of less than 2 or 1 W/(m*K).

In an embodiment of the invention a maximum length of a direct heat transmission path HTPI should be below 12 cm, preferably below 10 cm.

In an embodiment of the invention a maximum length of a direct heat transmission path HTPI is at least 0.5 cm.

THE FIGURES

Figure 2:
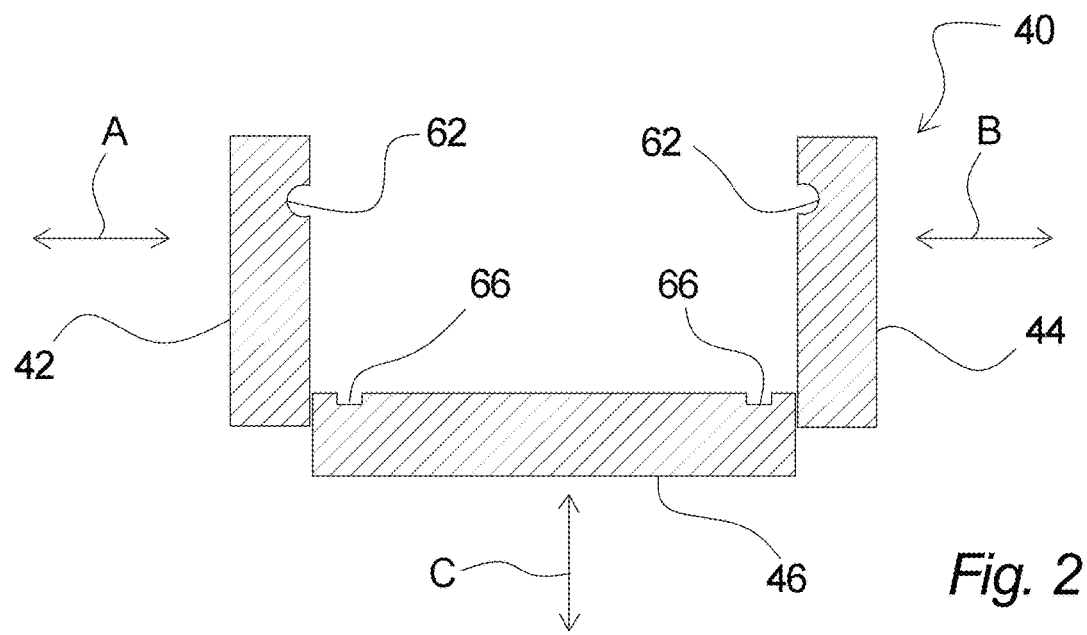
Figure 3:
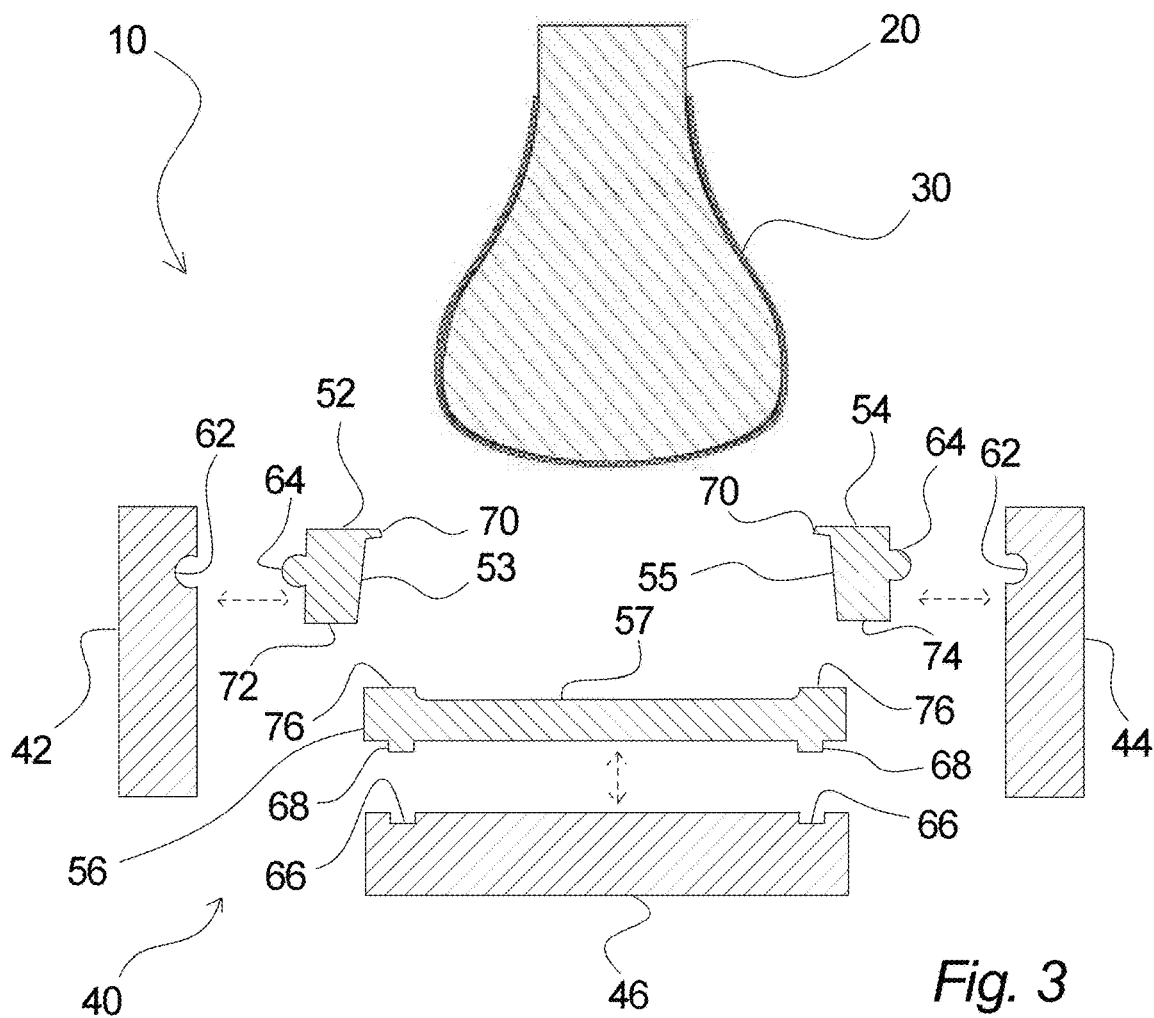
Figure 6:
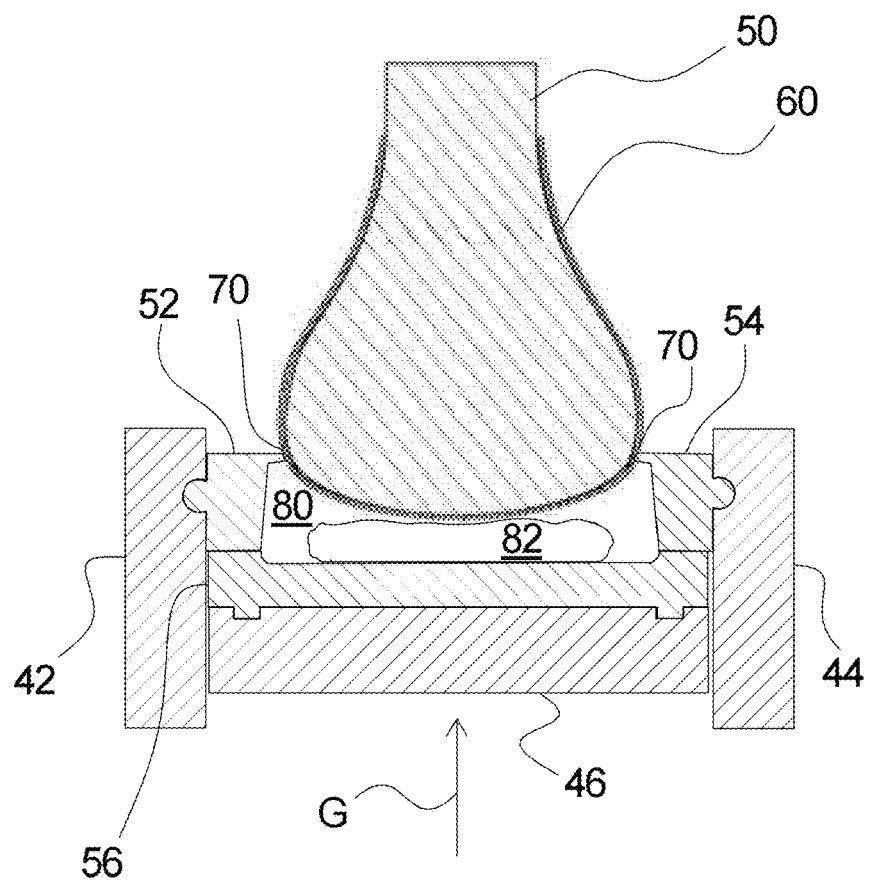
Figure 7:
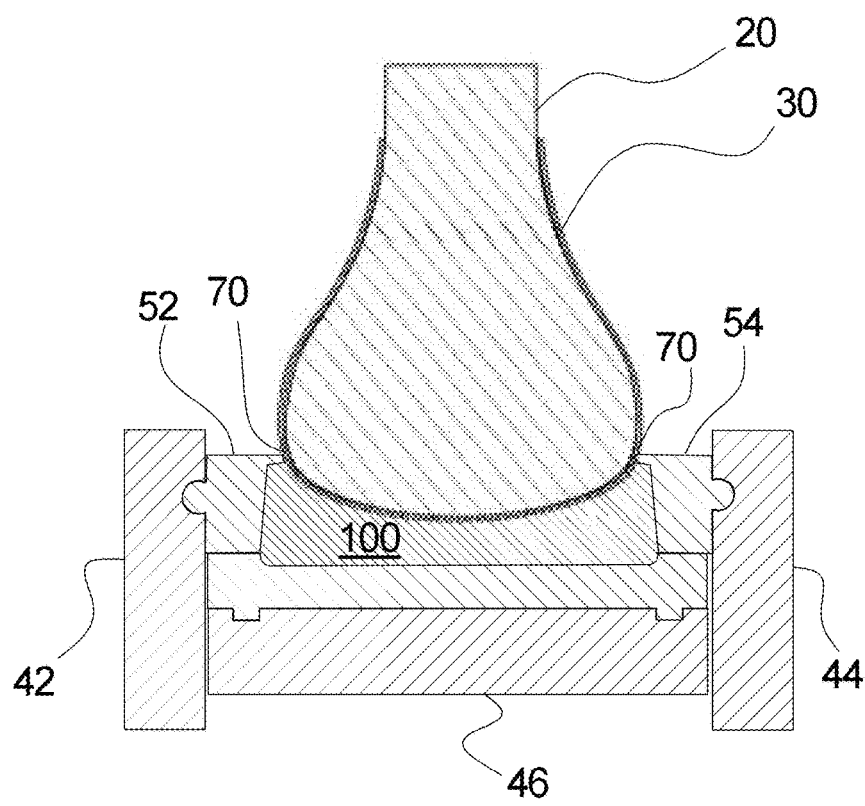
Figure 8:
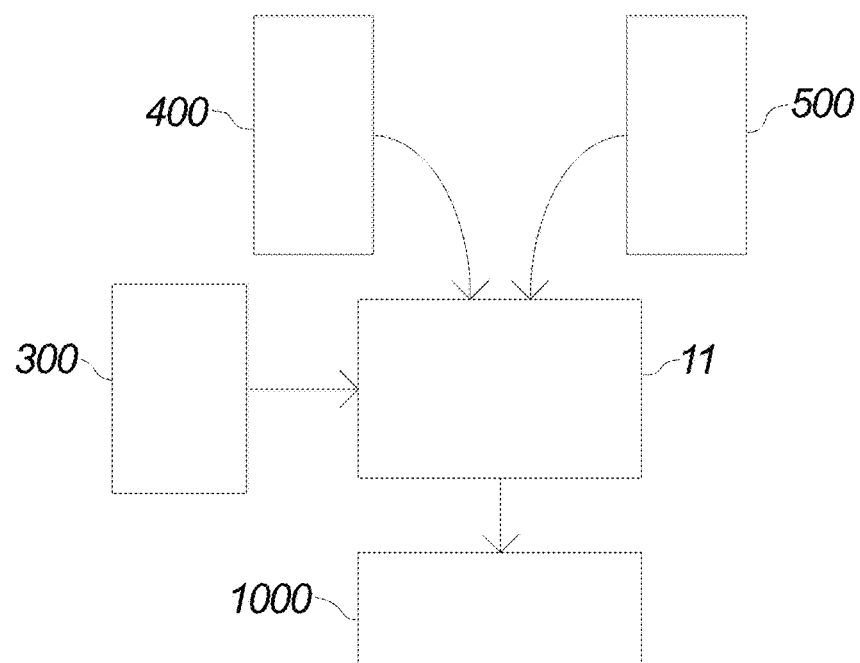
Figure 9A:
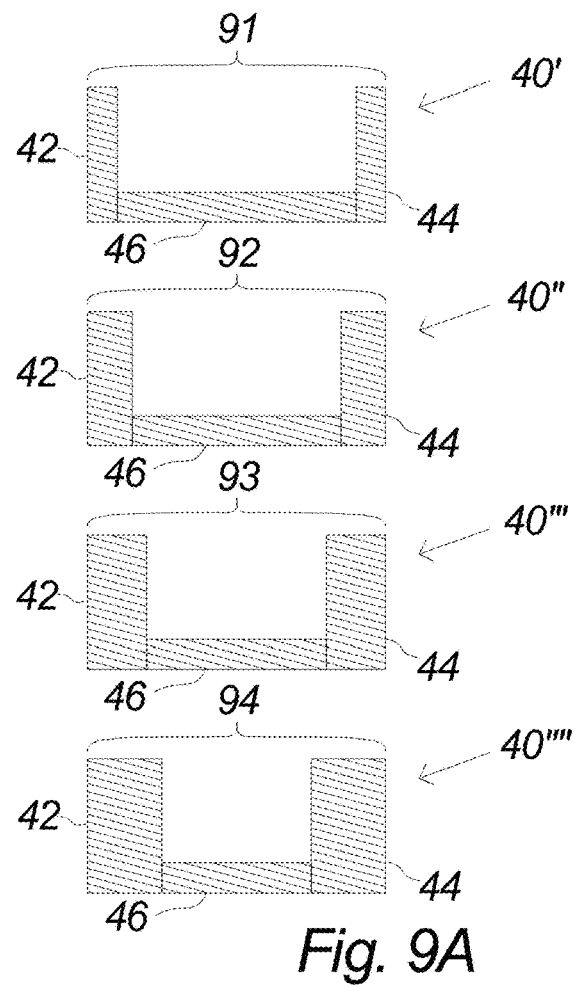
Figures 9B, 9C:
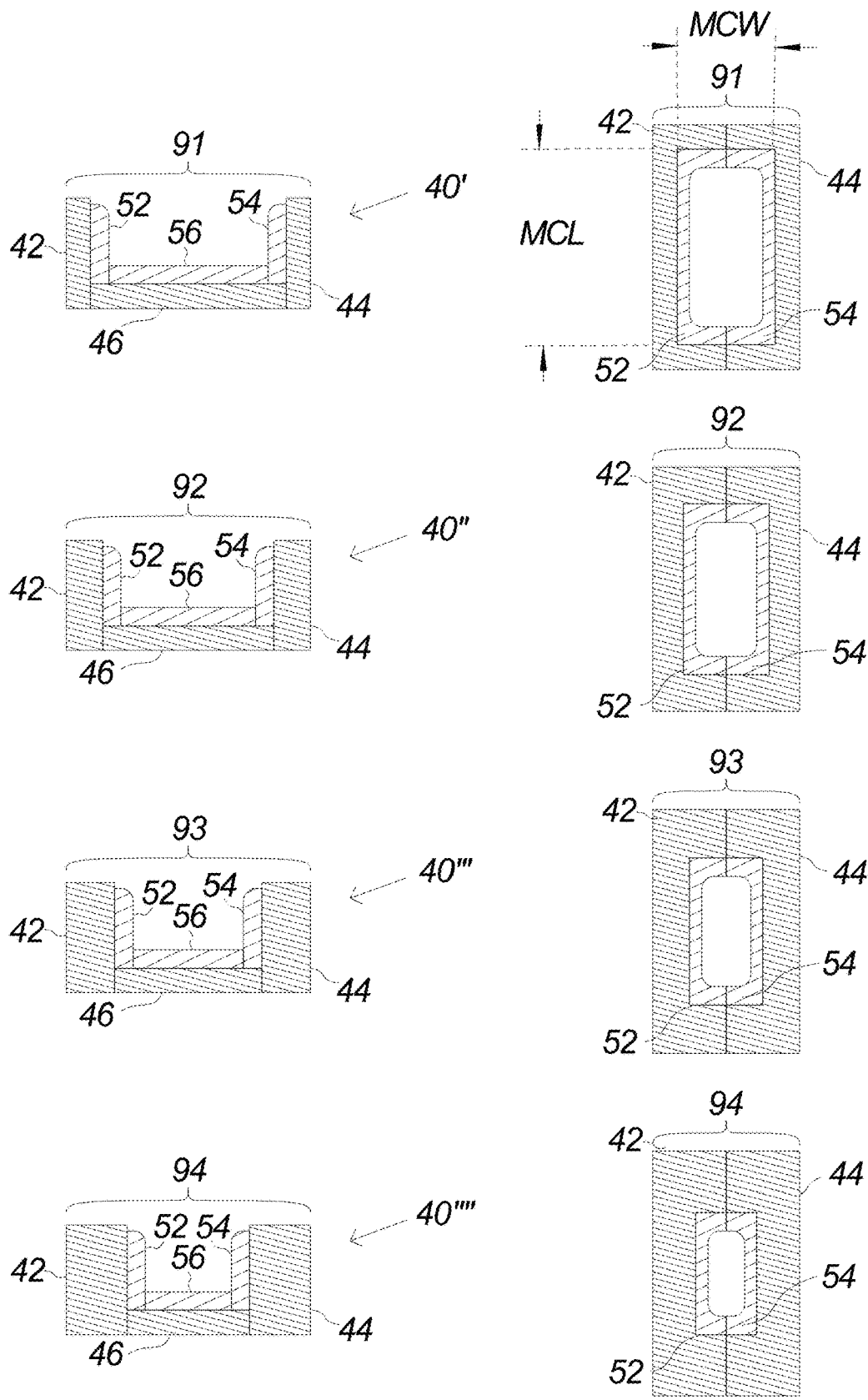
Figure 10:
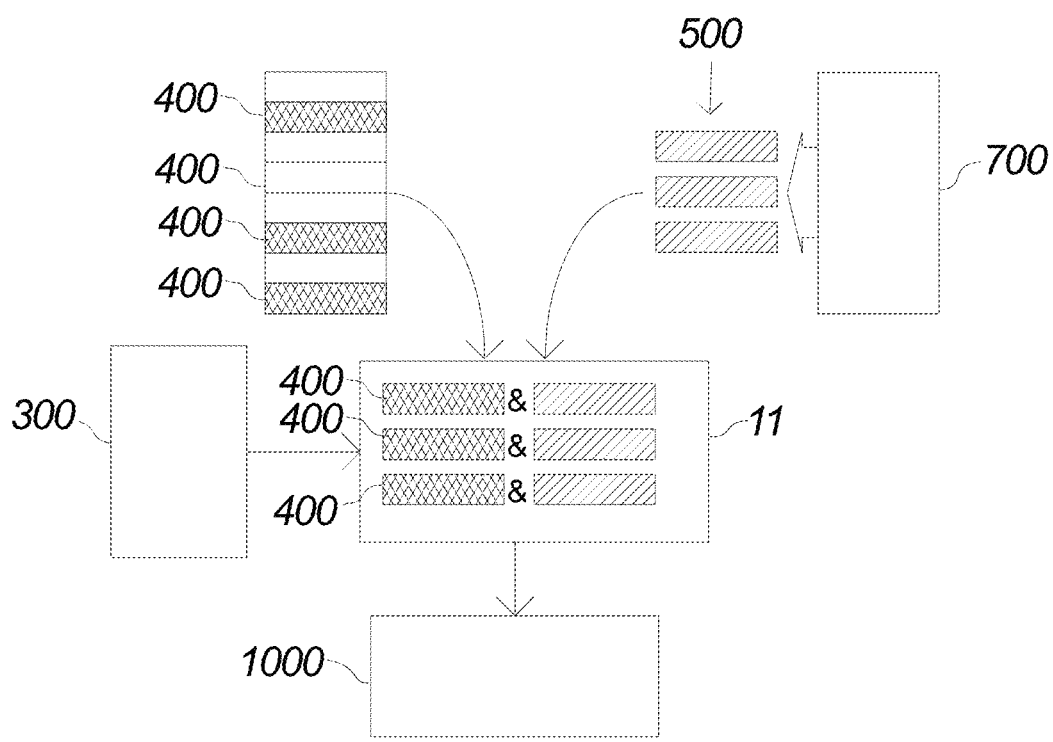
Figures 11A, 11B:
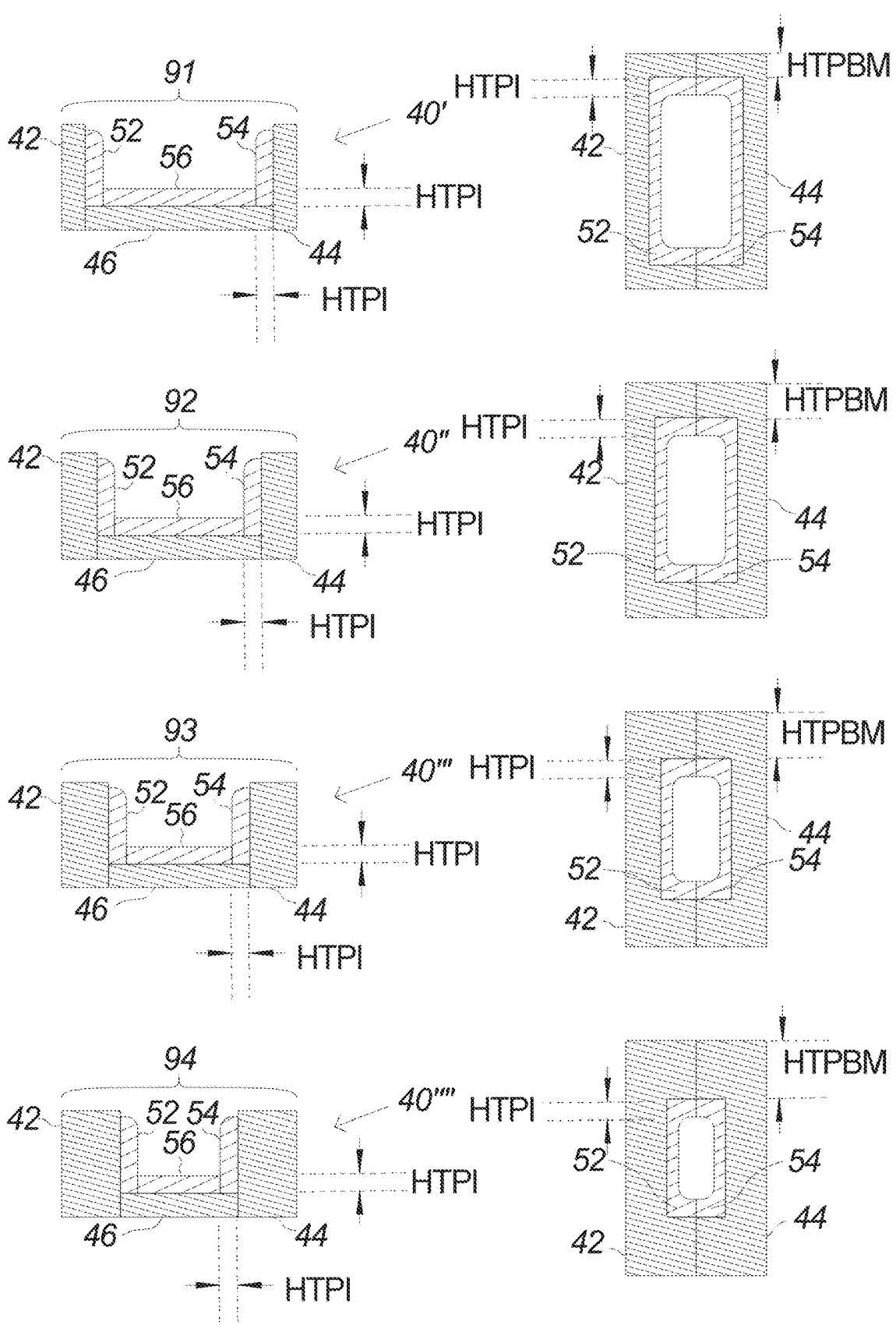
Figure 12A:
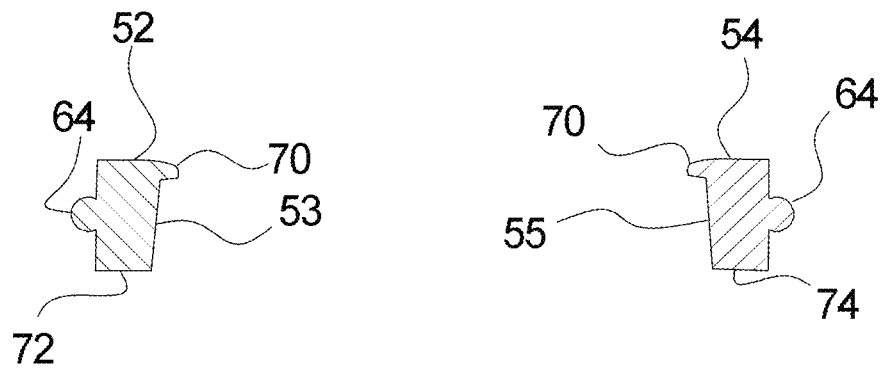
Figure 12B:
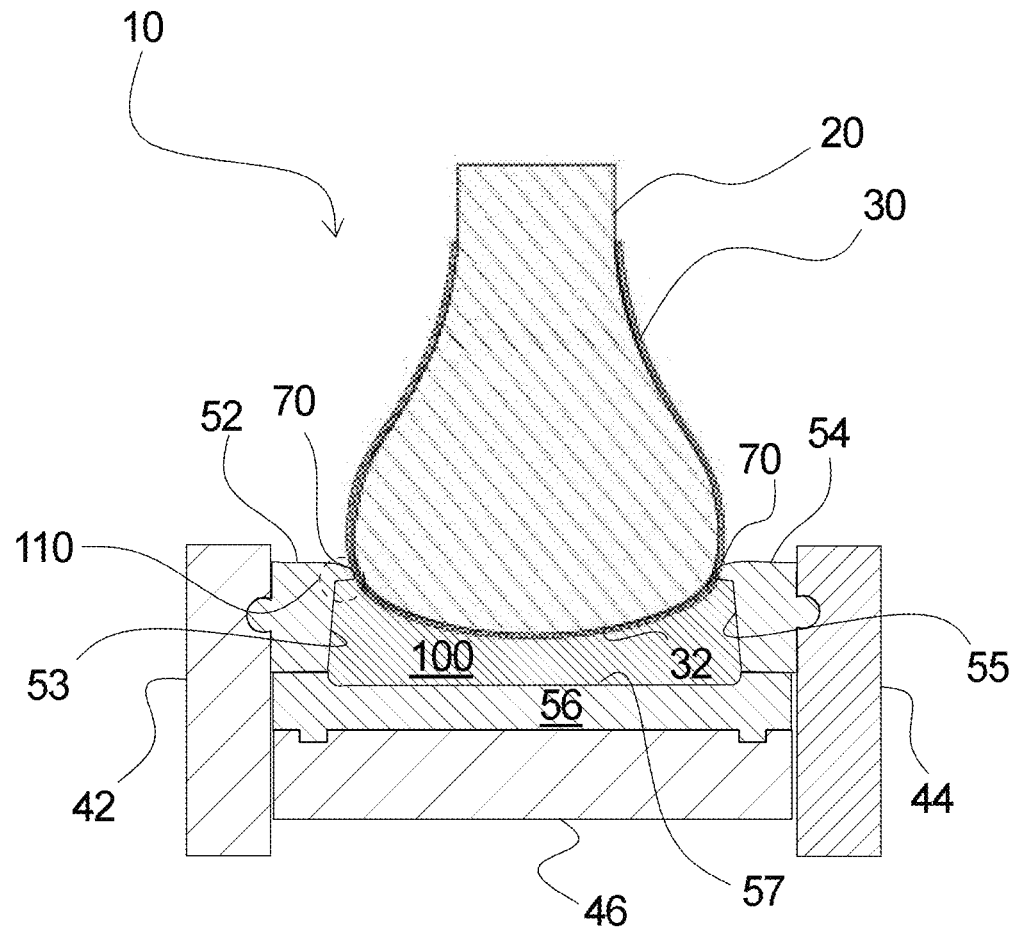
Figure 12C:
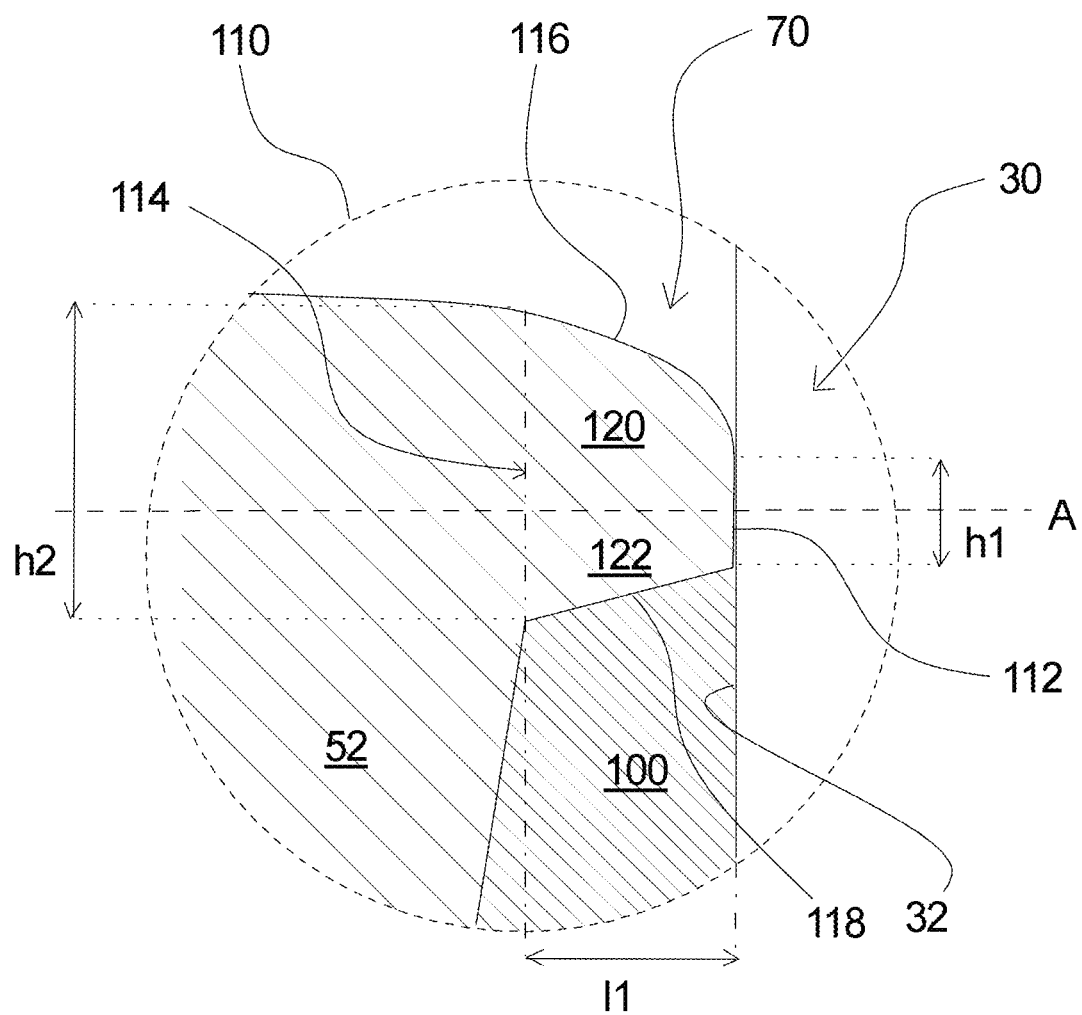

The invention will be explained in further detail below with reference to the figures of which FIG. 1 shows a schematically illustrated last and mould, seen in a cross-sectional view, as used for direct injection moulding of footwear according to a prior art, FIG. 2 shows a schematically illustrated basic direct injection mould, seen in a cross-sectional view, that may be used in connection with direct injection moulding of footwear according to the present disclosure, FIG. 3 shows a cross-sectional schematic diagram of a footwear injection mould in accordance with the present disclosure, FIGS. 4-7 show sectional schematic diagrams of a footwear injection mould from its open position to a closed position, FIG. 8 illustrates a system according to an embodiment of the invention, FIGS. 9A-C illustrate a set of base moulds within the scope of the invention, FIG. 10 illustrates a setup method of a direct injection process of footwear according to an embodiment of the invention, FIGS. 11A and 11B illustrate advantageous features of an embodiment of the invention, FIG. 12a illustrate a further embodiment of the direct injection mould inserts, FIG. 12b shows an embodiment of a cross-sectional view of a footwear injection moulding system, and FIG. 12c is an enlarged view of a cut-out of FIG. 12b relating to the lip area of the direct injection mould inserts.

DETAILED DESCRIPTION

With reference to FIG. 1 a prior art moulding system will be elucidated. This figure shows schematically a mould 2 and a last 20, both seen in a cross-sectional view, which last 20 and mould 2 may be utilized for direct injection moulding of footwear according to the prior art. The mould 2 may as mentioned above have been made out of metal, for example aluminium by e.g. CNC machinery and may as shown in FIG. 1 comprise a first side mould 4, a second side mould 6 and a bottom mould 8, which are arranged in such a manner that the mould 2 may be opened and closed, e.g. by the first side mould 4 and the second side mould 6 being able to be moved in horizontal directions as indicated with the arrows A, B and by the bottom mould 8 being arranged to be moved in the vertical direction as indicated with the arrow C. As shown in FIG. 1, the first side mould 4 and the second side mould 6 may be provided with a first side surface 5 and a second side surface 7, respectively, that have been made during the e.g. CNC milling, and which generally define a desired form of a side part of a shoe sole to be moulded. Further, the bottom mould 8 may correspondingly be provided with a bottom inner surface 8, which have been made during the e.g. CNC milling and which generally has a form corresponding to a desired form of the underside of the shoe sole to be moulded.

Further, it is shown in FIG. 1 that a footwear upper 30 may be put onto the last 20 and that the last 20 with the footwear upper 30 can be moved in various directions including downwards in relation to the mould 2 as indicated with the arrow D. It will be understood that when performing such a step, it is required that the mould 2 is in an open state in order to allow the last 20 to move into the mould 2. Hereafter the mould 2 may be closed, thus forming a mould cavity 80 between the footwear upper 30, the first side mould 4, the second side mould 6 and the bottom mould 8. The mould 2 is attached to injection moulding equipment (not shown in the figures, but illustrated e.g. in FIG. 8 as injection moulding equipment 11), by means of which injection material is injected into the mould cavity, where it comes into contact with the first side surface 5, the second side surface 7, the bottom inner surface 9 and the bottom parts of the footwear upper 30. When the injected material has taken the shape of the mould cavity, it is being cured.

Further details of the mould and the moulding process will be understood from the following, wherein a mould and the moulding process will be elucidated in connection with the FIGS. 2-7 that illustrate direct injection equipment and a direct injection process as utilized in connection with the present disclosure.

FIG. 2 shows a schematically illustrated basic direct injection mould 40, seen in a cross-sectional side view, that may be used in connection with direct injection moulding of footwear according to the present disclosure. The basic direct injection mould 40 may comprise a first basic side mould 42, a second basic side mould 44 and a basic bottom mould 46. It is noted that more than these three basic parts may be used for forming a basic direct injection mould 40, e.g. two or more basic side moulds at one or both sides, etc.

Generally, it is noted that the basic parts are movable in relation to each other, e.g. by the first basic side mould 42 and the second basic side mould 44 being able to move in e.g. horizontal directions as indicated by the arrows and by the basic bottom mould 46 being able to move in the e.g. vertical direction as indicated by the arrow, whereby the basic direct injection mould 40 can be arranged to open and close around a last.

Furthermore, it is noted that the basic parts are arranged to be coupled with insert parts (not shown here), e.g. by means of basic side coupling elements 62 comprised by the first basic side mould 42 and the second basic side mould 44, for example on or in e.g. the inner surfaces of these. Correspondingly, the basic bottom mould 46 comprises basic bottom coupling elements 66, for example on or in e.g. the inner surface of the basic bottom mould 46.

Even further, it is noted that the basic direct injection mould 40 may be configured to be attached to injection moulding equipment (not shown).

FIG. 3 shows a cross-sectional side view of a footwear injection mould 10 in accordance with the present disclosure, where the cross-sectional plane may be a vertical plane that may be seen as being perpendicular to the longitudinal axis of the footwear injection mould. The footwear injection mould comprises a basic direct injection mould 40 as described above and insert parts, examples of which will be described in the following.

Thus, the footwear injection mould 10 comprises a basic direct injection mould 40 having a first basic side mould 42, a second basic side mould 44 and a basic bottom mould 46. The footwear injection mould 10 in FIG. 3 is in an open state, where the first basic side mould 42, the second basic side mould 44 and the basic bottom mould 46 are spaced from each other, allowing access to the inner space from one or more positions, e.g. in order to allow insert parts to be mounted. The first basic side mould 42, the second basic side mould 44 and the basic bottom mould 46 are provided with attachment parts (not shown) that allow the basic direct injection moulds 42, 44, 46 to be attached to an injection moulding equipment (not shown), and where the attachment to the injection moulding equipment may be adapted to transfer heat from the injection moulding equipment to the basic direct injection moulds 42, 44, 46 so that the footwear injection mould can be warmed up to a predefined temperature to optimize the injection moulding of the footwear part in the mould cavity 80 (cf. e. g. FIG. 6).

The first basic side mould 42, the second basic side mould 44 and the basic bottom mould 46 may be provided with a first side insert 52, a second side insert 54 and a bottom insert 56, respectively, where the first side insert 52, the second side insert 54 and the bottom insert 56 may be coupled to the first basic side mould 42, the second basic side mould 44 and the basic bottom mould 46, respectively. The first basic side mould 42 and the second basic side mould 44 may be provided with basic side coupling elements 62 that are adapted to mate with insert side coupling elements 64 that allow the first side insert 52 and the second side insert 54 to be coupled to the first basic side mould 42 and the second basic side mould 44, respectively. The coupling elements 62, 64 may be adapted to hold the first side insert 52 and the second side insert 54 relative to the first basic side mould 42 and the second basic side mould 44, respectively, during the injection moulding process. In an analogous manner, the basic bottom mould 46 may be provided with basic bottom coupling elements 66 that that are adapted to mate with bottom insert coupling elements 68 that allow the bottom insert 56 to be coupled to the basic bottom mould 46. The coupling elements 66, 68 may be adapted to hold the bottom insert 56 relative to the basic bottom mould 46 during the injection moulding process. Thus, it may be ensured that the first side insert 52, the second side insert 54 and the bottom insert 56 are held in position while the footwear injection mould 10 is moved from its open position, as shown in FIG. 4 towards its closed position, shown in FIG. 6 and during the injection moulding process, as shown in FIG. 7.

As further illustrated in FIG. 3, the first side insert 52, the second side insert 54 and the bottom insert 56 may be coupled to the first basic side mould 42, the second basic side mould 44 and the basic bottom mould 46, respectively, when the basic direct injection mould 40 is in an open state, e.g. by engaging the respective coupling elements 62, 64, 66, 68 as indicated with the dash lined arrows in FIG. 3. These coupling elements may be designed in various manners, e.g. as snap-locking means, self-locking means, press couplings, mating couplings, etc. It is noted that for the sake of clarity, the first basic side mould 42, the second basic side mould 44 and the basic bottom mould 46 are shown in FIG. 3 in positions removed from each other, whereby furthermore the coupling with the insert parts, e.g. 52, 54 and 56 may be clearly observed.

Figure 4:
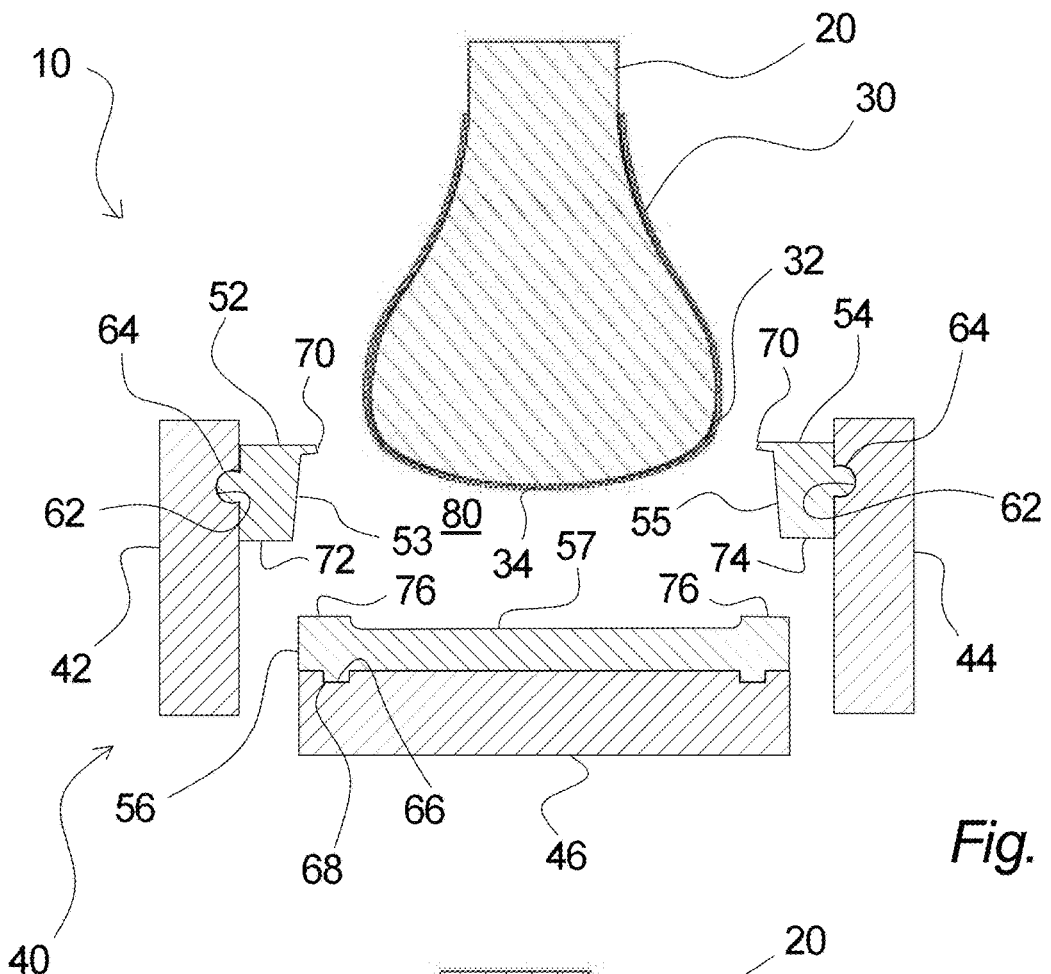

FIG. 4 shows a cross-sectional view of a footwear injection mould 10 corresponding to FIG. 3, wherein the first side insert 52, the second side insert 54 and the bottom insert 56 have been coupled to the first basic side mould 42, the second basic side mould 44 and the basic bottom mould 46, respectively. Further, the footwear injection mould 10 has been arranged in an open state with a last 20, which carries a footwear upper 30, placed in a position near the opening of the footwear injection mould 10.

The first side insert 52, the second side insert 54 and the bottom insert 56 may be adapted to provide a mould cavity 80, by providing a first side insert surface 53, a second side insert surface 55 and a bottom insert surface 57 providing an outer surface of the element to be moulded inside the mould cavity 80. The upper part of the mould cavity 80 may be delimited by the footwear upper 30, which may be mounted on a last 20, where the last fixes the upper 30 relative to the mould cavity 80. Furthermore, the first side insert 52 and the second side insert 54 are provided with a lip 70, where the lip has a form and shape that is adapted to follow an outer surface 32 of the upper 60. When the lip 70 is pushed into contact with the outer surface 32 of the upper 30, as e.g. seen in FIG. 5 the lip may close off the mould cavity in conjunction with the bottom part 34 of the upper 30, and assist in preventing that injection moulding material which is introduced into the mould cavity 80 may exit the mould cavity 80 via the upper opening of the cavity 80.

The first side insert 52 and the second side insert 54 may be provided with a first 72 and a second contact surface 74 positioned on a bottom part of the first side insert 52 and the second side insert 54, respectively, which may be adapted to abut an upper contact surface 76 of the bottom insert surface 57. The contact surfaces may be adapted to close off the mould cavity 80 between the first side insert 52, the second side insert 54 and the bottom insert 56. The contact surface may extend from a front end (toe end) of the first side insert 52, the second side insert 54 and the bottom insert 56 towards the respective back ends (heel ends).

Furthermore, the first side insert 52 and the second side insert 54 may have third and/or a fourth contact surface (not shown) between the moulds, where the contact surfaces may be positioned in an area where the first side insert 52 and the second side insert 54 divide the sides of the mould cavity between them. FIG. 4 shows that the last 20 has been introduced into the moulding cavity, allowing the bottom part of the footwear upper 30 to be exposed to the upper part of the mould cavity 80. The last 20 may be moveable in a vertical direction in and out of the mould cavity 80, so that when the footwear part has been moulded to the upper, the last 20, the upper 30 and the footwear part may be moved away from the mould cavity for removal, and the next last and upper may be introduced into the mould cavity.

Figure 5:
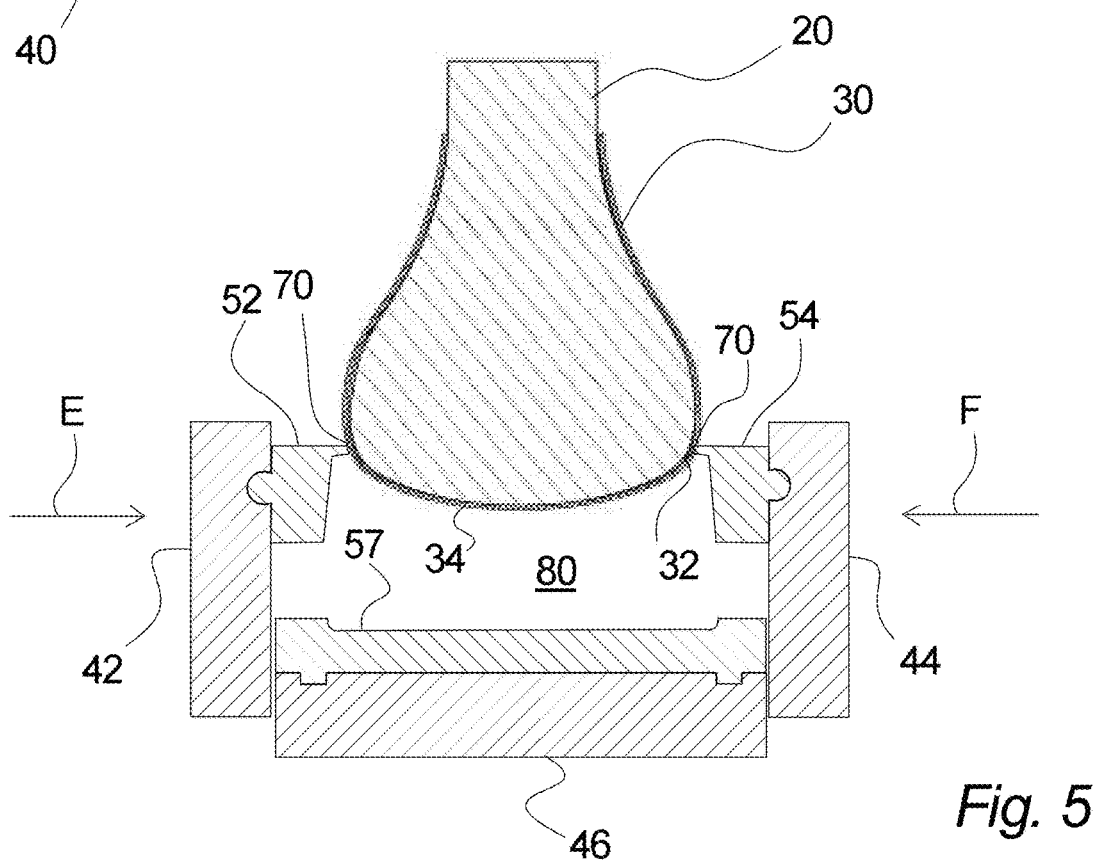

FIG. 5 shows an intermediate state of the footwear injection mould, where the first basic side mould 42, the second basic side mould 44, the first side insert 52 and the second side insert 54 have been moved inwards in the directions E, F towards the upper 30, where the lip 70 is moved into contact with the upper 30, and the first side insert 52 and the second side insert 54 come into contact with each other at their toe and heel end (not shown) to close off the upper part of the mould cavity 80. The lip 70 and the contact surfaces are forced into contact so that the flow of the injection material cannot pass out of the mould cavity via the contact surfaces and the lip 70.

Prior to this movement, the injection material 82 may be introduced into the mould cavity, e.g. by introducing it to the upper surface 57 of the bottom insert 56 prior to the closing of the footwear injection mould 10, where the mould 10 may be closed allowing the injected material to expand to fill the mould cavity 80 and to bond to the lower part 34 of the upper 30.

FIG. 6 shows where the basic bottom mould 46 and the bottom insert 56 have been moved upwards in a vertical direction G, where the bottom insert 56 abuts the first side insert 52 and the second side insert 54, thus closing the mould cavity 80. When the footwear injection mould 10 is closed, the mould cavity 80 is closed to the surrounding environment, ensuring that the injected material 82 takes the shape of the mould cavity 80.

FIG. 7 shows where the injected material 82 has expanded to fill out the entire volume of the mould cavity 80, where the injected material 82 comes into contact with the inner surfaces of the first side insert 52, the second side insert 54 and the bottom insert 56, causing the outer surface of the injected material 82 to take the shape of the mould cavity and the inner surfaces of the first side insert 52, the second side insert 54 and the bottom insert 56, to form a footwear sole 100.

When the injected material 82 has cured, the first 42 and second basic side mould 44 together with the first side insert 52 and the second side insert 54, respectively, may be moved in a horizontal movement opposite to the direction E, F shown in FIG. 5, and the basic bottom mould 46 together with the bottom insert 56 may be moved in the opposite direction to the direction G shown in FIG. 6, thereby opening the footwear injection mould. The movement of the first basic side mould 42, the second basic side mould 44 and the basic bottom mould 46 allows the first side insert 52, the second side insert 54 and the bottom insert 56 to be removed from the injected material 82 and the last 20, the upper 30 and the sole 100 may be removed from the mould 10.

If the injection moulding equipment is supposed to be utilized for a different type of shoe or a different size of shoe, the first side insert 52, the second side insert 54 and the bottom insert 56 may be decoupled from the basic direct injection mould 40, e.g. from the first 42 and second basic side mould 44 and from the basic bottom mould 46, and replaced with another set of first side insert 52, second side insert 54 and bottom insert 57, that define an alternative mould cavity, as well as exchanging the last and the upper to close off the upper part of the mould cavity, where the additional set of first side insert, second side insert and bottom insert may be coupled to the basic direct injection mould 40, e.g. to the first 42 and second basic side mould 44 and to the basic bottom mould 46, respectively. Thus, the basic direct injection mould 40 may be utilized for a plurality (more than one) of inserts, e.g. a first side insert, a second side insert and a bottom insert, and the injection moulding equipment may be quickly made ready for the injection of a different type of article of footwear.

FIG. 8 illustrates a system and some basic principles of an embodiment within the scope of the invention.

A number of basic injection moulds 400 is provided. Advantageously, one or more base moulds of the total number of base moulds may be reused from a previous manufacturing of footwear in another design. The base moulds may differ in size, e.g. in relation to thickness of side-walls. Alternatively, the same sizes may be produced in one batch and then another size or another design is produced in another batch with other mould inserts.

A number of mould inserts 500 are provided. The mould inserts are provided so they, together with corresponding base moulds, define the desired sizes to be injection moulded in the desired design.

One or more of the moulds 400 with corresponding inserts 500 are then attached to direct injection equipment 11 for a manufacture of a plurality of footwear articles 1000 where the sole is provided and moulded to footwear uppers 300.

According to a preferred embodiment of the invention, the manufacturing system should include at least two different base moulds and corresponding mould inserts.

Generally, within the scope of the invention, in a preferred embodiment, the base mould and/or the components forming the base mould may be provided e.g. in a metal, e.g. casted or milled.

The inserts may be made by different techniques within the scope of the invention. One attractive technique may be e.g. be 3D printing. In this way, it is possible to use same base moulds for different designs or batches and then simply 3D print mould inserts and use these in combination with the general-purpose base moulds.

It should be noted that is has shown that even insert moulds provided by 3D printing in polymers or resins may easily be used in production series of e.g. 5000 or 10000 footwear articles, such as shoes. When manufacturing in larger footwear series, such as 100000, it may be required to reprint the mould inserts. It is however noted that such manufacturing of further mould inserts may be manufactured relatively fast e.g. by 3D printing. This also means that such printing may be delayed until a need is detected.

The method and system according to the invention is thus very dynamic, and smaller series of shoes may be established with fewer cost as conventional moulds are extremely expensive and requires significant setup time.

FIG. 9A illustrates an advantageous embodiment and feature of the invention. The illustrated embodiment includes a plurality of base moulds, i.e. basic injection moulds 40', 40", 40,'" and 40"". The moulds are illustrated by their respective cross-sections.

In the illustrated embodiment, the base mould, e.g. base mould 40', comprises a mould set of a first basic side mould 42, a second basic side mould 44 and a basic bottom mould 46. The base moulds and corresponding inserts are designed for the manufacture of footwear in different sizes and/or footwear designs. The illustrated embodiment shows four different sizes of the same design.

Each of these moulds 40', 40", 40,'" and 40"" forms an individual base mould set, which may be mounted and operated with footwear injection mould equipment (11). The machine may e.g. be a direct-soling machine from DESMA, such as DESMA D522/24. In order to optimize the process, minor modification may be applicable, as long as mould insert(s) are applied.

The base mould sets may be fitted interchangeably to the injection mould equipment, thereby facilitating that each mould set may be used for manufacturing of footwear by direct injection with little or no manual adaptation once fitted to the equipment.

The base moulds may typically be provided in a metal, e.g. aluminium, in order to provide the desired temperature condition in the mould during moulding. Such materials are known within the art and the properties and the injection mould equipment to operate such moulds are also known within the art. Adaptation of the injection mould equipment may of course be necessary or practical to facilitate optimal running of the injection mould equipment, manual or automatic. It is however preferred that the injection mould equipment per se may operate as it operates when applying conventional injection moulds in terms of processing parameters, material use, etc.

The illustrated moulds 40', 40", 40,'" and 40"", in this embodiment each formed by three different parts, may advantageously, due to geometrical layout, be applied for the manufacturing e.g. of different sizes of the same footwear design.

It should be noted that the moulds 40', 40", 40,'" and 40"" preferably should be designed to feature the same or almost the same outer perimeter so the moulds can be mounted to the injection moulding equipment 11 without use of adapters or adaptations of the injection moulding equipment 11.

In some embodiments of the invention, such modifications or use of adapters may of course be applied.

FIG. 9B illustrates that direct injection mould inserts (52, 54, 56) have been inserted into respective base moulds, i.e. moulds 40', 40", 40,'" and 40"". The system is shown in cross-section.

The illustrated system comprises four base moulds, each with different corresponding mould inserts. The system may of course be designed and applied with other numbers of base moulds depending on the manufacturing setup.

In the present context, the four base moulds are provided in four different base sizes and each corresponding set of mould insert(s) are designed to provide a different size of the same footwear design.

FIG. 9C illustrates the direct injection moulds 40', 40", 40,'" and 40"" of FIG. 9B with inserted mould inserts 52, 54, 56. The moulds are shown from above and in cross-section. The mould inserts 56 are thus not visible but may be seen in the corresponding FIG. 9B.

This manufacturing setup may of course be varied significantly within the scope of the invention. The main feature in the present context is that the base moulds may be applied as general-purpose moulds, whereas the inserts may define unique footwear designs, e.g. differing only in size within the same footwear design.

The mould inserts for each of the illustrated base moulds are different, thereby providing different moulding cavities. According to the invention, as illustrated above, it is therefore possible to provide moulds with as thin moulds inserts, even over a range of several footwear sizes for a given footwear design.

This is advantageous, as the direct injection mould method requires a certain degree of heating of the mould. This heating is difficult to sustain in practice during manufacturing, if the thickness of the of the inserts are too high. The present method and system thus make it possible to manufacture footwear inserts in different sizes.

FIG. 9C illustrates the denomination of the base mould inner width MCW and the base mould inner length MCL when mounted in and functionally working with an associated direct injection process equipment (not shown) in its closed position during moulding. It is clear that the illustrated system comprises different base moulds applied for different footwear sizes 91-94 and the illustrated base moulds have different base mould inner lengths MCL and also different base mould inner width MCW. In the present embodiment this is done in order to keep the thickness of the mould inserts 52 and 54 as low as possible.

FIG. 10 illustrates a further advantageous feature of an embodiment of the invention.

The illustrated system comprises a set of available basic moulds 400. These moulds may of course be manufactured for the purpose but may advantageously comprise a number of base moulds available for any footwear series to be produced. The primitive illustration shows that the total number of eight basic moulds 400 are available. It goes without saying that some of the basic moulds may have the same size, but in terms of available moulds, at least two basic mould should be available. This will be apparent from the following explanation.

In the illustrated embodiment three basic moulds 400, different in size, are selected from the total number of available basic moulds. Again, the number chosen and the number of moulds which is different in size can be any appropriate number in order to comply with the provisions of the invention, as long as both numbers are at least two, and the number of selected basic moulds are at least the number of moulds selected in different size. 3D-printing equipment 700 is furthermore provided and applied for the 3D printing of mould inserts 500 fitting with the selected basic moulds 400. Explanation of one exemplary use of combined basic moulds are illustrated in FIGS. 2-6 in different aspects.

It should be stressed that a basic mould in the present context in the industry would very often be a mould provided in three parts, a sole support and two sides. Again, this is illustrated in FIG. 2-6. Other numbers may of course be provided within the scope of the invention, as long as it is possible to mould a sole to a footwear upper and retrieve the moulded footwear from the mould again. The same thing applies in relation to the mould inserts 500, where the description exemplifies the use of three co-working insert mould parts for the establishment of one effective working mould. Other numbers of sub-parts forming an insert mould may be applied within the scope of the invention given the restriction given above.

The three selected basic moulds 400, and the three correspondingly produced different insert moulds 500 are then fitted with each other and fitted to a direct injection manufacturing equipment for the manufacture of a number of footwear articles 1000 and the basis of direct injection material, such as poly urethane and premanufactured footwear uppers 300 fed to the equipment 11. In the present illustrative embodiment, three different series are provided, e.g. three different sizes or three different designs.

One of many advantages related to the illustrated method and system is that a number of base moulds (different in size) may be applied for right/left footwear, different size footwear and/or different footwear/sole-designs, without requiring expensive milling of conventional moulds. Such system requires individual metal moulds for each size and design to be produced, and the process of manufacturing such moulds are very time-consuming and expensive.

By the application of different sizes of the moulds, it is furthermore ensured that the inserts may be applied with a minimum thickness/volume of 3D printing material. This is important as it is conventionally understood that direct injection moulding requires a reasonable high ability of heat transmission of the mould, in order to be able to keep the mould at a desired temperature during the complete manufacturing process. This process includes both cooling during manufacture and heating during the initial start-up.

The inventive system makes it possible to run the manufacturing even in spite of a typically insert mould material may be polymers or resins, natural or synthetic. It should in the context be noted that such polymers very often have a relatively low heat transmission when compared to metals, such as aluminium.

A number of differently size basic moulds thus makes it possible to have relatively "thin" insert moulds and thereby manufacture footwear despite different heat transmission properties of the applied insert mould material and the basic mould material.

FIGS. 11A and 11B illustrate considerations when applying the method and the system according to an embodiment of the invention. The illustration is of course simplistic but serves to define and explain key design properties according to an advantageous embodiment of the invention.

FIGS. 11A and 11B corresponds to FIGS. 9B and 9C, but now with some explanation in relation to heat conductivity of the basic direct injection mould and the mould insert.

As previously mentioned above the base mould, e.g. base mould 40', comprises a mould set of a first basic side mould 42, a second basic side mould 44 and a basic bottom mould 46.

The basic mould, and the basic mould parts, are made in a material, such as aluminium, preferably a material having a high thermal conductivity, such as above 150 W/(m*K).

The basic mould is furthermore fitted with mould inserts, 52, 54, 56. The mould inserts are adapted to both fit the respective, and differently sized inner cavities of the base moulds 40', 40", 40,'" and 40"".

A typical challenge with mould insert(s) is that it/they may be expensive to manufacture with a high thermal conductivity using e.g. conventional milling of e.g. aluminium blocks.

An alternative way of producing the inserts is according to a preferred embodiment of the invention by means of 3D printing. The most popular 3D printing materials are relatively cheap, but the thermal conductivity is typically below 1.0 W/(m*K).

The illustrated embodiment will now be explained with reference to thermal properties. For each of the sizes 91 to 94 to be produced, exemplary heat transmission paths HTPI of the inserts 52, 54, 56 are illustrated so as to highlight that the design of a base set of base moulds 40', 40", 40,'" and 40"" facilitate substantially the same heat conductive properties of the inserts, even when producing footwear in different sizes and even though the heat transmission paths of the basic mould HTPBM is varying. At least, the applied system and method, surprisingly, by the use of a base set of base moulds in different inner size having high thermal conductivity together with mould inserts having a relatively low thermal conductivity designed to be as small as possible, may advantageously provide a system and method which may both provide high-quality DIP footwear, but also be a part of a system and method which may easily be switched between different footwear designs and/or sizes and also at a reduced level of manufacturing costs as the mould inserts provided in conventional 3D materials, such as photopolymers, can be manufactured relatively cheap and fast compared to any method and system known in the art.

In order to improve the thermal conduction between the mould insert and the base mould, it is possible to subject thermally conducting paste to the surfaced between the basic mould parts and the mould inserts.

It is difficult to provide a specific guideline as to how the exact size/volume limits should be designed to be optimized as such values depends among others on the applied mould insert material. For mould insert material having a conductivity of less than 2 or 1 W/(m*K) the maximum length of a direct heat transmission path HTPI should be below 12 cm, preferably below 10 cm. It should however be noted that a minimum length would e.g. be around 1 cm.

FIGS. 12a-12c illustrate a further embodiment of the direct injection mould inserts and in particular the first side insert 52 and the second side insert 54. Thus, FIG. 12a shows an embodiment of a cross-sectional view of a pair of a first side insert 52 and a second side insert 54, corresponding to the examples as illustrated in e.g. FIGS. 3-7. However, the insert lip 70 of the side inserts as illustrated in FIGS. 12a-12c is configured in a particular manner as it will be explained in the following.

FIG. 12b corresponds to FIG. 7 and thus shows an embodiment of a cross-sectional view of a footwear injection moulding system 10, where a footwear part is moulded and where the side inserts as illustrated in FIG. 12a are applied. Thus, it is shown that injected material has expanded to fill the mould cavity to form a footwear sole 100 as it has been explained in connection with e.g. FIGS. 3-7.

FIG. 12b shows that the injected material has expanded to fill out the entire volume of the injection chamber and thus has come into contact with the inner surfaces 53, 55, 57 of the first side insert 52, the second side insert 54 and the bottom insert, respectively, and the outer surface 32 of the footwear upper 30, thereby causing the injected material to take the corresponding shape to form a footwear sole 100.

When the injected material has cured, the first 42 and second basic side mould 44 together with the first side insert 52 and the second side insert 54, respectively, may be moved in an e.g. horizontal movement, and the basic bottom mould 46 together with the bottom insert 56 may be moved e.g. downwards, thereby opening the footwear injection mould, whereby the last 20, the upper 30 and the sole 100 may be removed from the mould 10.

In FIG. 12b, the lip 70 is pushed into contact with the outer surface 32 of the footwear upper part 30. Thereby, the lip 70 closes off (seals off) the injection chamber together with the bottom part of the footwear upper part 30, and assists in preventing injected material, which is introduced into the injection chamber, from escaping the injection chamber via the upper part of the injection chamber. The lip 70 may have a shape that is adapted to follow the outer surface 32 of the footwear upper 30.

The features of the first side insert 52 and the second side insert 54 and in particular the lip 70 will be explained in further detail in the following with reference to FIG. 12c, which is an enlarged view of the cut-out 110 shown in FIG. 12b, where the circular cut-out 110 is relating to the lip area of the first side insert 52. It will be understood, though, that what is explained in the following similarly applies to the second side insert 54, its lip 70, etc. as well.

In FIG. 12c, the cut-out 110 shows the lip 70 contacting the outer surface 32 of the footwear upper 30, wherein the lip 70 may have a shape that is adapted to follow the outer surface 32 of the footwear upper 30. The lip 70 may be in the form of a ridge.

The shape of the lip 70 and of said outer surface 32 are shown to be flat and to extend in a plane, e.g. a vertical plane. Obviously, the lip 70 and the outer surface 32 may have various other shapes, such as rough, bend, curvilinear.

The lip 70 may comprise an upper contacting surface 112 for contacting the outer surface 32 of a footwear upper 30, a connecting end 114 connected to the first side insert 52, an upper surface 116 faced away from the injection chamber and a lower surface 118 faced towards the injection chamber as shown in FIG. 12c.

The lip 70 may have a height h2 at the connecting end 114 of the lip 70 that is larger than the height h1 at the upper contacting surface 112 of the lip 70, relative to a normal A of the upper contacting surface 112. The normal A of the upper contacting surface 112 is configured to intersect a centre point of the upper contacting surface 112 seen in the height direction as illustrated in FIG. 12c. A lip plane is defined by the normal A of the upper contacting surface 112 along a width of the lip 70, said lip plane configured to define a boundary between an upper half 120 and a lower half 122 of the lip 70, the upper half 120 arranged between the lip plane and the upper surface 116 and the lower half 122 arranged between the lip plane and the lower surface 118.

The lip 70 has a length l1 (as shown in FIG. 12c) defined by the distance from the upper contacting surface 112 to the connecting end 114 along the normal A of the upper contacting surface 112.

In one example, the height h1 may be in the region between 2 to 6 mm, where the height h1 may more specifically be between 3 and 5 mm, or even more specifically around 4 mm. The height h1 of the upper contacting surface 112 has been shown as being above 2 mm, as a lower thickness may cause the material to bend, deform or warp during injection. This may especially be in a situation where the mould insert is 3D printed from e.g. a polymeric material.

In comparison, traditional moulds, made out of aluminum or other metal substances may have an upper contacting surface height h1 that is around 1.5 mm.

In one example, the height h2 may be between 6 and 15 mm, where the height h2 may more specifically be between 7 and 12 mm, where the height may more specifically be between 5-8 and 10 mm. The increased height h2 provides support to the lip especially when the material is 3D printed from e.g. a polymeric material. In comparison, traditional moulds made out of aluminium or other metal substances may have a height h2 that is close to 2-3 mm.

In one embodiment the size ratio between the height h1 and h2 may be around 1:2, where h2 may be twice the height of h1. In one embodiment the size ratio may be around 1:1.5, where the height h2 is 50% larger than h1.

In one exemplary embodiment the length of the lip l1 may have size that is at least larger than the height h2, i.e. that the length ratio between the length of the lip vs. the height h2 is at least 1:1. In another embodiment the length of the lip may have a size that is smaller than the height h2, i.e. l1<h2. Thus, the height h2 provides support for the length of the lip, where the height h2 of the lip may have to be increased when the length l1 is increased.

LIST OF REFERENCE NUMBERS

2 Mould
4 First side mould
5 First side surface
6 Second side mould
7 Second side surface
8 Bottom mould
9 Bottom inner surface
10 Moulding system
11 Injection moulding equipment
20 Last
30 Footwear upper
32 Outer surface of footwear upper
34 Bottom part of footwear upper
40 Basic direct injection mould
42 First basic side mould
44 Second basic side mould
45 Second side insert surface
46 Basic bottom mould
50 Set of direct injection mould inserts
52 First side insert
53 First side insert surface
54 Second side insert
55 Second side insert surface
56 Bottom insert
57 Bottom insert surface
62 Basic side coupling element
64 Insert side coupling element
66 Basic bottom coupling element
68 Bottom insert coupling element
70 Insert lip
72 First contact surface
74 Second contact surface
76 Upper contact surface
80 Mould cavity
82 Injected material
91-93 Different moulds for e.g. different sizes
100 Footwear sole
110 Cut-out
112 Upper contacting surface
114 Connecting end
116 Upper surface 118 Lower surface
120 Upper half
122 Lower half
300 Footwear uppers
400 Basic moulds
500 Insert moulds
700 3D printing equipment
1000 Footwear articles
FS Footwear sizes
HTPI Heat transmission path of injection mould
HTPBM Heat transmission path of basic mould
MCW Base mould cavity width
MCL Base mould cavity length
A Normal to the upper contacting surface 112 (at centre point)
h1 Height of lip at the upper contacting surface
h2 Height of lip at the connecting end
l1 Length of lip

The invention claimed is:

1. A direct injection production method of footwear, said method comprising steps of, for a specified footwear design:
    selecting a set of basic direct injection molds from at least two sets of basic direct injection molds that are differently sized from each other, each of which is attachable to and operable with injection molding equipment;
    providing, for each of the at least two sets of basic direct injection molds, at least one set of corresponding direct injection mold inserts;
    providing a footwear upper;
    assembling the selected set of the basic direct injection molds with the at least one set of corresponding direct injection mold inserts to establish a mold cavity of a footwear size defined by the at least one set of corresponding direct injection mold inserts and the footwear upper;
    injecting sole material into the mold cavity; and
    curing the sole material on the footwear upper,
    wherein the at least two sets of basic direct injection molds, when attached to the injection molding equipment, differ in length, and/or in width.

2. The direct injection production method according to claim 1, wherein a thermal conductivity of the at least two sets of basic direct injection molds and the at least one set of corresponding direct injection mold inserts are different.

3. The direct injection production method according to claim 1, wherein the at least two sets of basic direct injection molds are each releasably attached to the injection molding equipment.

4. The direct injection production method according to claim 1, wherein the at least two sets of basic direct injection molds are selected from a plurality of available sets of basic direct injection molds.

5. The direct injection production method according to claim 1, wherein mold insert material has a thermal conductivity of less than 2 W/(m*K).

6. The direct injection production method according to claim 1, wherein a maximum length of a heat transmission path through the at least one set of corresponding direct injection mold inserts is below 12 cm.

7. The direct injection production method according to claim 1, wherein the at least one set of corresponding direct injection mold inserts is adapted to fit the at least two sets of basic direct injection molds having different basic mold cavity width and/or different basic mold cavity length.

8. The direct injection production method according to claim 1, wherein the assembling includes a step of mounting the at least one set of corresponding direct injection mold inserts to either of the at least two sets of basic direct injection molds, thereby forming the mold cavity with the footwear upper.

9. The direct injection production method according to claim 8, wherein the at least two sets of basic direct injection molds are configured for at least partly channelling the sole material into the mold cavity.

10. The direct injection production method according to claim 8, wherein the sole material forms a sole part bonded to the footwear upper, the sole part corresponding to either one of at least two pre-defined footwear sizes.

11. The direct injection production method according to claim 1, wherein the at least two sets of basic direct injection molds each correspond to different ranges of sole part sizes.

12. The direct injection production method according to claim 1, wherein the at least one set of corresponding direct injection mold inserts are manufactured by an additive manufacturing process.

13. The direct injection production method according to claim 1, wherein the at least one set of corresponding direct injection mold inserts correspond to a sole part size.

14. The direct injection production method according to claim 1, wherein the at least two sets of basic direct injection molds are at least partly manufactured from metal.

15. The direct injection production method according to claim 14, wherein the metal is aluminum.

16. The direct injection production method according to claim 1, wherein the at least two sets of basic direct injection molds each include a first basic side mold, a second basic side mold, and a basic bottom mold.

17. A direct injection system for manufacturing footwear, the system comprising:
    at least two sets of basic direct injection molds that are differently sized from each other, each of which is attachable to and operable with injection molding equipment;
    at least one set of corresponding direct injection mold inserts for each of the at least two sets of basic direct injection molds,
    wherein the system is configured to inject sole material into a mold cavity, the mold cavity being established via assembling:
        a selected set of the at least two sets of the basic direct injection molds,
        the at least one set of corresponding direct injection mold inserts, and
        a footwear upper,
    wherein a footwear size of the mold cavity is defined by the direct injection mold inserts and the footwear upper,
    wherein the system is configured to cure the sole material on the footwear upper, and
    wherein the at least two sets of basic direct injection molds, when attached to the injection molding equipment, differ in length, and/or in width.

* * * * *